United States Patent [19]

Kraft

[11] Patent Number: 4,752,477

[45] Date of Patent: Jun. 21, 1988

[54] INSECT-ACTIVE ASSEMBLY COMPRISING POLYMERIC BODY MEMBER

[75] Inventor: Paul Kraft, Spring Valley, N.Y.

[73] Assignee: Chesebrough-Pond's Inc., Greenwich, Conn.

[21] Appl. No.: 31,811

[22] Filed: Mar. 30, 1987

Related U.S. Application Data

[63] Continuation-in-part of Ser. No. 873,738, Jun. 12, 1986.

[51] Int. Cl.$^4$ .......................... A24F 25/00; A61L 9/04
[52] U.S. Cl. ..................................... 424/403; 424/411
[58] Field of Search ................................. 424/403, 411

[56] References Cited

U.S. PATENT DOCUMENTS

| | | | |
|---|---|---|---|
| 3,426,133 | 2/1969 | Shotton | 424/411 |
| 3,857,934 | 12/1974 | Bernstein et al. | 424/411 X |
| 3,864,468 | 2/1975 | Hyman et al. | 424/411 |
| 4,325,938 | 4/1982 | Kapp | 424/411 |

FOREIGN PATENT DOCUMENTS 2169805  7/1986  United Kingdom ................ 424/411

Primary Examiner—Nancy A. B. Swisher
Attorney, Agent, or Firm—Melvin H. Kurtz

[57] ABSTRACT

An insect-active assembly which can provide insect repellency, insecticidal action, or both, and which is adapted to be directly affixed to the garment worn by a person is provided. The assembly comprises a polymeric body which contains an insect-active composition, as a volatile plasticizer, which, over time, migrates from the polymeric body to provide the desired degree of insect-active action. The insect-active assembly can be affixed directly to the garment of a person either by being configured to fit over or be affixed to a portion a the person's garment, (e.g., as a hatband) or by having separate means provided to affix it to the garment. Such separate means for affixing the polymeric body to the garment include pressure-sensitive adhesive coatings and hook-and-loop fasteners.

8 Claims, No Drawings

INSECT-ACTIVE ASSEMBLY COMPRISING POLYMERIC BODY MEMBER

This is a continuation-in-part of U.S. patent application Ser. No. 873,738, filed June 12, 1986.

BACKGROUND OF THE PRESENT INVENTION

The present invention relates to an article of manufacture which is especially adapted to be attached to the garment of a person and which has "insect-active" characteristics. The term "insect-active", as used in the present specification, is intended to indicate that the article functions in regard to insect repellency, insecticidal action, or a combination of both, when placed in the intended environment on the garment of a person.

It is well-known in the art to apply insect repellent compositions to the skin of person by placing such compositions on the skin. It is also well-known to attach to the garments of a person, articles comprising absorbent pads containing insect repellent compounds.

SUMMARY OF THE PRESENT INVENTION

The present invention represents a distinctly novel means for supplying an insect-active assembly or article of manufacture which can be suitably attached to a garment worn by a person to thereby provide that person with the benefits attendant with such insect-active characteristics, i.e., insect repellency, insecticidal action, or a combination of both. The present invention allows a person to bring the insect-active composition to the vicinity of their person without having to actually have it contact their skin where it might give rise to undesirable physical reactions (irritation, rashes, and the like).

The present invention comprises the use of a polymeric body which contains a volatile insect-active composition as a plasticizer for the polymer body so that, over time, the insect-active composition or polymer plasticizer mimics the action of a fugitive plasticizer by volatilizing and diffusing from the polymeric body to achieve the desired level of insect-active action in the environs in which the polymeric body is placed. The body is either configured (e.g., in strip form) so that it can be appropriately affixed per se to a garment worn by a person (e.g., fashioned in the form a hatband to be placed around the person's hat) or it can have separate means to directly affix it to the garment worn by the person.

DETAILED DESCRIPTION OF THE PRESENT INVENTION

As mentioned above, the insect-active assembly of the present invention comprises a polymeric body which contains an insect-active composition as a volatile plasticizer for the polymer body. The plasticizer, over time, migrates from the polymer body to achieve the desired level of insect action (repellency, insecticidal action, or both) in the environment in which the polymeric body is placed, i.e., by being directly affixed to a garment worn by a person. Generally speaking, an insect repellent composition is preferred since it will act to keep insects away from the person. This is generally a more important consideration than actually killing the insect or insects.

The polymeric body which forms a major portion or component of the assembly of the present invention is preferably a thermoplastic polymer, such as polyvinyl chloride, which can be most appropriately fashioned in strip form. However, it is to be understood that other polymers and other shapes for the body can be used, provided that the resulting body can be plasticized with the insect-active composition so that the composition functions as a fugitive plasticizer and, over time, migrates from the body to achieve the desired level of insect-active action in the vicinity of the polymeric body. Suitable alternative polymers include, but are not limited to, polystyrene, acrylic polymers and copolymers, and polyvinyl acetate and its copolymers.

The type of insect-active compositions which are intended to be embraced by the present invention include those liquid insect-active compositions (e.g., insect repellents) which function as plasticizers for the selected polymer. Included as appropriate compositions of this type are the substituted and unsubstituted hexanediols, the substituted toluamides, and the synthetic and natural pyrethrins which are all well-known insect repellent compositions. The amount of insect-active composition which can be added to the polymeric body can be varied and can perferably range from about 5 to about 100 parts by weight of insect-active composition to every 100 parts by weight of polymer. The type and amount of insect-active agent will largely be determined by the level of protection desired and will depend upon such factors as the strength of the active composition, its diffusion rate from the polymer, and the locale and time of the season where the article is intended to ultimately be used.

As will be appreciated by persons of ordinary skill in the art, the extent to which the fugitive plasticizer/insect-active composition migrates from the polymer is, as mentioned above, variable depending upon such considerations as the type of resin composition, and the molecular weight of the polymer or resin. It can also be made dependent upon the presence of any co-plasticizers or other materials that might be present in the polymer. For example, the addition of relatively volatile co-solvents for the insect-active composition, such as methyl ethyl ketone, can give rise to an overall composition of insect-active compound or composition as co-solvent that will migrate from the polymer body at a faster rate than would be possible if only the insect-active composition were used as a fugitive plasticizer. This would tend to bring the insect-active composition (e.g., insect repellent) out at a faster rate.

As indicated before, the present invention resides in either the appropriate configuring of the polymer body so that it can be directly affixed to or held by a garment, or to the provision of a separate means to directly affix the substrate to the garment worn by a person. For example, if a person desires to form a hat band in accordance with the present invention they need merely configure the polymeric body containing the volatile insect-active composition into the shape of a hat band which can be appropriately slipped over the dome of the hat thereby providing insect-active action in the vicinity of the head of the person. Should separate means be desired to directly affix the polymeric body or substrate to a garment worn by a person, they can be provided, for example, by placing a layer of suitable adhesive on the polymeric body, e.g., a layer of pressure-sensitive adhesive. An alternative way of achieving the desired degree of affixment to a substrate would be to appropriately bond one portion of a hook-and-loop fastener (e.g., a VELCRO fastener) to the polymeric body with the other, mating portion being affixed (e.g., by sewing or the like) to the garment of the person. Either of these two fastening means are exemplary of ways to appropriately affix the substrate of polymer and insect-active plasticizer to the person's garment.

The foregoing is intended to supply a general description of the present invention with the Examples which follow being used to merely illustrate certain preferred embodiments thereof.

EXAMPLE 1

Pyrethrins Used as Plasticizers for Polyvinyl Chloride

Sixty grams of polyvinyl chloride dispersion resin (SCC-40 grade from Stauffer Chemical Company) were blended with a mixture of 30 grams of N,N'-diethyltoluamide and 30 grams of pyrethrin (available as Premium Pyrocide-175 from McLoughlin, Gormly, King & Company). The resulting paste was then coated on a metal try coated with TEFLON fluorocarbon polymer and the paste was subsequently heated to about 300° C. to form a clear flexible sheet. This polymeric sheet was readily removed from the coated metal tray. The resulting sheet of polyvinyl chloride resin, which was plasticized with the insect repellent composition, was then coated with a pressure-sensitive adhesive and a release paper covering. The composite was cut into strips and was used on clothing, when desired. The strips were simply bonded to the clothing by removal of the release paper and by pressing and thereby attaching the flexible film of polyvinyl chloride to the garment by means of the pressure-sensitive adhesive coating.

EXAMPLE 2

A blend of 50% of the polyvinyl chloride resin used in Example 1 and 50% of the pyrethrin insect repellent used in Example 1 was mixed until a fluid paste was obtained. The paste was then cast and heated as described in Example 1 to form a clear film which was coated with a pressure-sensitive adhesive to which was bonded a VELCRO hook-and-loop fastener. The composite that resulted was adapted for use on clothing.

The foregoing Examples represent certain preferred embodiments of the present invention but should not be construed in a limiting sense since they merely illustrate certain embodiments thereof. The scope of protection that is sought is set forth in the claims which follow.

I claim:

1. An insect-active assembly which comprises a polymeric body which contains a volatile insect-active composition as a volatile plasticizer therein, said body being adapted to be directly affixed to a garment worn by a person.

2. An assembly as claimed in claim 1 wherein the polymeric body is configured so that it is adapted to be directly affixed to the garment without separate attachment means.

3. An assembly as claimed in claim 1 which has separate means attached to the polymeric body which are intended to directly affix the polymeric body to a garment worn by a person.

4. An assembly as claimed in claim 3 wherein the means to affix the polymeric body to a garment comprise an adhesive coating on the body.

5. An assembly as claimed in claim 3 wherein the means to directly affix the polymeric body to a garment comprise components of a hook-and-loop fastener.

6. An assembly as claimed in any of claims 1–5 wherein the polymeric body is formed by a thermoplastic polymer.

7. An assembly as claimed in any of claims 1–5 wherein the polymeric body is formed of polyvinyl chloride.

8. An assembly as claimed in any of claims 1–5 wherein the insect-active composition is an insect repellent.

* * * * *